UNITED STATES PATENT OFFICE.

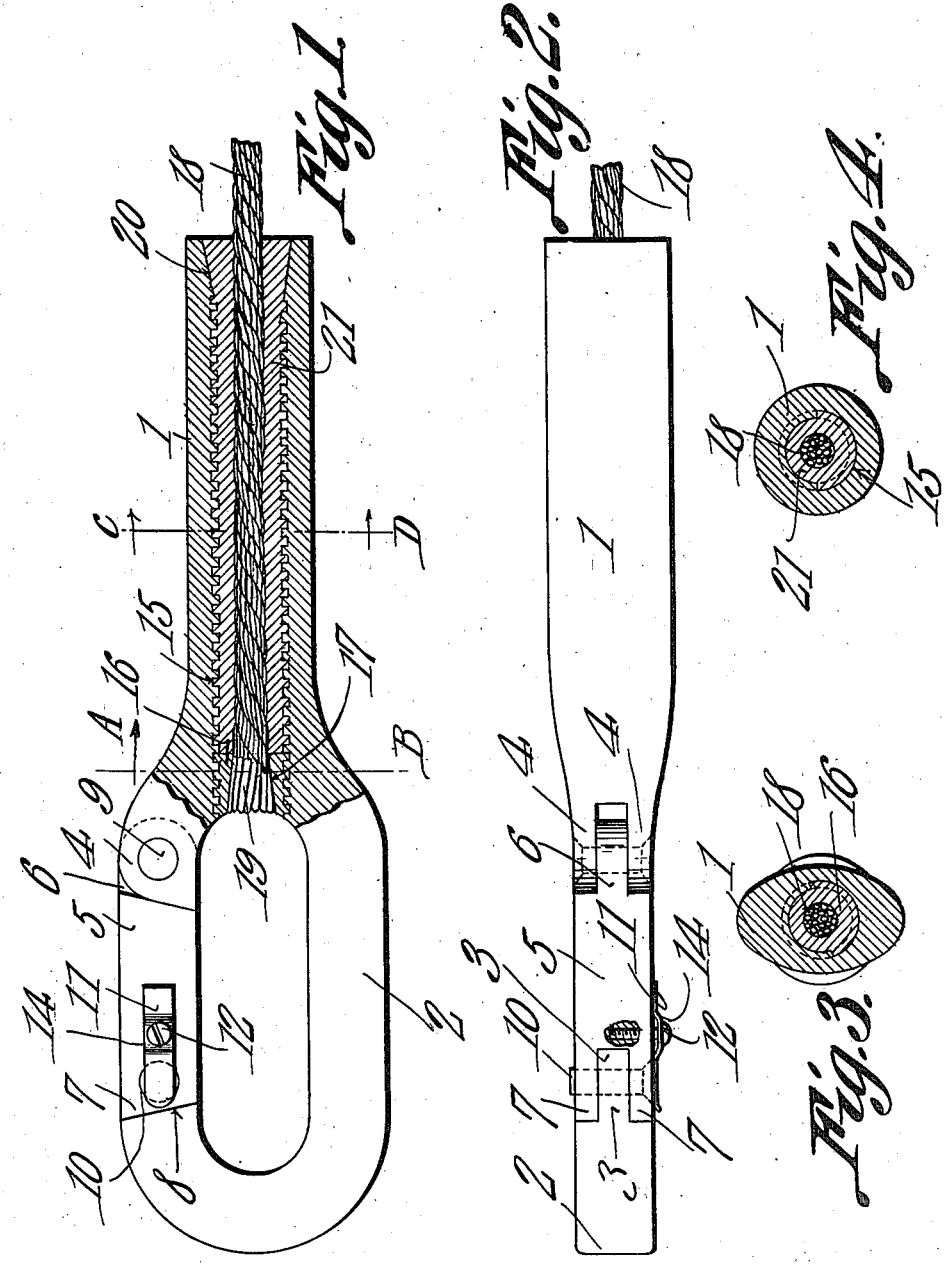

CHARLES STEVENSON, OF CORAOPOLIS, PENNSYLVANIA.

WIRE CABLE, SOCKET, AND COUPLING.

974,719.                    Specification of Letters Patent.    Patented Nov. 1, 1910.

Application filed March 30, 1910. Serial No. 552,320.

*To all whom it may concern:*

Be it known that I, CHARLES STEVENSON, a citizen of the United States, residing at Coraopolis, in the county of Allegheny and State of Pennsylvania, have invented a new and useful Wire Cable, Socket, and Coupler, of which the following is a specification.

It is the object of this invention to provide a device whereby a cable end may readily be connected with a fixed support of any sort; and with this end in view, the invention consists in providing a novel means for connecting the cable end with an attaching structure, and in adapting the attaching structure to be connected with a fixed support, and to be locked in place thereon.

In the drawings, Figure 1 is a side elevation, parts being broken away; Fig. 2 is a top plan; Fig. 3 is a transverse section upon the line A—B of Fig. 1; and, Fig. 4 is a transverse section upon the line C—D of Fig. 1.

The invention includes, as a primary and fundamental element, a socket 1, upon one end of which there is an integrally formed, open sided link 2. At one end, this link 2 is provided with an outstanding finger 3, and at the other end, with spaced arms 4.

The space between the ends of the link is bridged by a tongue 5, having at one end a finger 6 adapted to register between the arms 4 of the link 2, and at the other end provided with arms 7, between which the finger 3 of the link is adapted to be received. Upon either side of its finger 3, the link 2 is beveled, in its end faces as denoted by the numeral 8, the corresponding end of the tongue 5 being likewise beveled, to prevent the tongue from moving within the contour of the link. A pivot element 9 is extended through the arms 4 of the link, and through the finger 6 of the tongue 5 which is located between said arms. Upon this pivot element 9, the tongue 5 is adapted to tilt, the free end of the tongue being retained by a locking pin 10 of any desired construction, which is extended through the arms 7 of the tongue 5 and through the finger 3 of the link 2. In case this locking pin 10 is not threaded, it may be retained in place by a spring plate 11, held against the outer face of the tongue 5 by means of a screw 12 or the like, the head of which is adapted to bear against the outwardly convexed portion 14 of the spring plate 11. The free end of the spring plate 11 bears against the end of the locking pin 10, and the convexity in the spring plate, denoted by the numeral 14, tends to increase the resiliency of the spring plate and to enhance its bearing effect against the end of the locking pin 10.

There is an axial opening in the socket 1 and this opening, as denoted by the numeral 15, is preferably threaded. A bushing 16 is threaded to engage the threaded portion 15 of the socket, and this bushing is adapted to be inserted into the socket at that end of the axial opening therein which is adjacent the link 2.

There is an axial opening through the bushing 16 and, adjacent the outer end of the bushing, this axial opening is flared, as shown at 17. A cable 18 may be extended through the socket 1 from end to end, and through the opening in the bushing 16, the cable, at its extremity, being stranded, or otherwise enlarged as shown at 19, to fit in the flared portion 17 of the bushing 16.

That end of the socket 1 which is remote from the link 2 is flared in its axial opening as shown at 20. This flare at 20 permits a molten metal, Babbitt or the like, to be readily poured into the interior of the socket 1 about the cable 18. The bushing 16 serves, not only as a means for retaining the end of the cable 18, but, as well, as a closure whereby the molten metal which is poured into the interior of the socket may be prevented from flowing entirely therethrough.

When the molten metal is in place within the interior of the socket 1, the metal will be engaged in the threaded face 15 of the socket. Thus, when the device is assembled in its completed form, the socket 1, the cable 18, and the bushing 16 will be held securely in place by the molten metal 21, as soon as the same has cooled within the socket.

The device is capable of a wide variety of applications, which will readily suggest themselves to a rigger. It is obvious that by opening the tongue 5, the link 2 may be made to engage an eye-bolt or the like, whereby the cable 18 may be secured to a derrick or like support.

Having thus described the invention, what is claimed is:

1. A device of the class described comprising an internally threaded socket; a bushing housed entirely within the contour of the socket and threaded to engage the socket, the bushing being adapted for connection with a flexible element, whereby the flexible element may protrude from one end of the socket; the bushing being shorter than the socket, to expose a part of the threads of the socket adjacent that end of the socket through which the flexible element protrudes, whereby the threads may serve to retain a packing about the flexible element.

2. A device of the class described comprising an internally threaded socket; a bushing threaded to fit within the socket and having an opening flared adjacent the outer face of the bushing; a cable inserted through the socket and through the bushing and having its end enlarged for engagement in the flaring portion of the opening in the bushing; and a packing resting against the bushing and engaged in the threads of the socket and compressed about the cable; the end of the socket remote from the bushing being flared to provide for the insertion of the packing.

In testimony that I claim the foregoing as my own, I have hereto affixed my signature in the presence of two witnesses.

CHARLES STEVENSON.

Witnesses:
W. S. RAMSEY,
J. W. HECK.